United States Patent
Masuda et al.

(10) Patent No.: US 12,444,319 B2
(45) Date of Patent: Oct. 14, 2025

(54) VOICE OUTPUT METHOD

(71) Applicant: TOYOTA JIDOSHA KABUSHIKI KAISHA, Toyota (JP)

(72) Inventors: Taizo Masuda, Yokohama (JP); Ryota Tomizawa, Mishima (JP); Sei Miyazaki, Susono (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 619 days.

(21) Appl. No.: 17/977,026

(22) Filed: Oct. 31, 2022

(65) Prior Publication Data

US 2023/0230504 A1   Jul. 20, 2023

(30) Foreign Application Priority Data

Jan. 17, 2022  (JP) ................. 2022-005068

(51) Int. Cl.
*G09B 21/00* (2006.01)
*G06F 3/16* (2006.01)

(52) U.S. Cl.
CPC ............. *G09B 21/00* (2013.01); *G06F 3/167* (2013.01)

(58) Field of Classification Search
None
See application file for complete search history.

(56) References Cited

U.S. PATENT DOCUMENTS

| | | | | |
|---|---|---|---|---|
| 2012/0062357 A1* | 3/2012 | Slamka | ................. | G01C 21/20 340/4.11 |
| 2014/0307070 A1* | 10/2014 | Woods | ................. | H04N 21/812 348/62 |
| 2020/0156659 A1* | 5/2020 | Shannon | ................. | B60K 35/22 |
| 2023/0230504 A1* | 7/2023 | Masuda | ................. | G06F 3/167 434/112 |
| 2023/0251824 A1* | 8/2023 | Masuda | ................. | G06F 3/167 715/729 |
| 2025/0021295 A1* | 1/2025 | Kim | ........................ | H04R 1/025 |
| 2025/0166607 A1* | 5/2025 | Bose | ................. | G06V 10/7715 |

FOREIGN PATENT DOCUMENTS

JP           2021-124757 A           8/2021

* cited by examiner

*Primary Examiner* — Jonathan C Kim
(74) *Attorney, Agent, or Firm* — Dinsmore & Shohl LLP

(57) ABSTRACT

A voice output method is a voice output method in a moving body of public transportation. The voice output method includes: a storage step of storing a voice output to an inside of the moving body, the voice being stored by being divided into a guide voice related to information on the moving body and an advertising voice related to advertising; a determination step of determining whether or not a passenger of the moving body includes a visually impaired person; and a restraint step of, by the moving body, restraining the advertising voice from being output when determination is made that the passenger includes the visually impaired person.

3 Claims, 2 Drawing Sheets

VOICE OUTPUT METHOD

CROSS-REFERENCE TO RELATED APPLICATION

This application claims priority to Japanese Patent Application No. 2022-005068 filed on Jan. 17, 2022, incorporated herein by reference in its entirety.

BACKGROUND

1. Technical Field

The present disclosure relates to the technical field of a voice output method in public transportation.

2. Description of Related Art

For example, in a fixed-route bus as public transportation, a voice related to advertising is often output in a vehicle. Regarding in-vehicle advertising of public transportation, for example, a technique of outputting, when a vehicle is stopped, an advertising voice corresponding to a stop position of the vehicle, such as a station, for example, after an output of a guide voice corresponding to the stop position is finished has been proposed (see Japanese Unexamined Patent Application Publication No. 2021-124757 (JP 2021-124757 A)).

SUMMARY

Public transportation is used not solely by an able-bodied person but also by, for example, a disabled person, such as a visually impaired person. Sound is important information for the visually impaired person to know a surrounding situation or the like. For example, when a voice related to advertising is output in the vehicle of public transportation, it may be difficult for the visually impaired person to know the surrounding situation or the like. JP 2021-124757 A described above does not consider the visually impaired person.

The present disclosure has been made in view of the above circumstances, and the present disclosure provides a voice output method capable of restraining, for example, a visually impaired person's grasp of the situation from being distracted.

A first aspect of the present disclosure relates to a voice output method in a moving body of public transportation, including a storage step, a determination step, and a restraint step. The storage step is a step of storing a voice output to an inside of the moving body. The voice is stored by being divided into a guide voice related to information on the moving body and an advertising voice related to advertising. The determination step is a step of determining whether or not a passenger of the moving body includes a visually impaired person. The restraint step is a step of, by the moving body, restraining the advertising voice from being output when determination is made that the passenger includes the visually impaired person.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
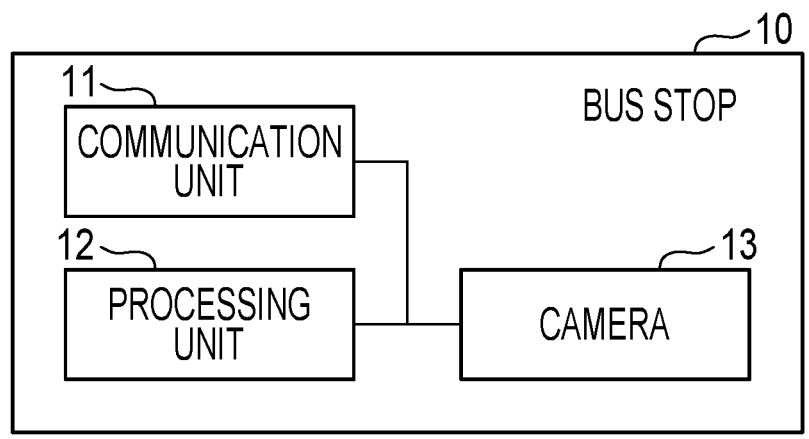
FIG. 1 is a block diagram showing a configuration of a public transportation system according to an embodiment.
Figure 1:
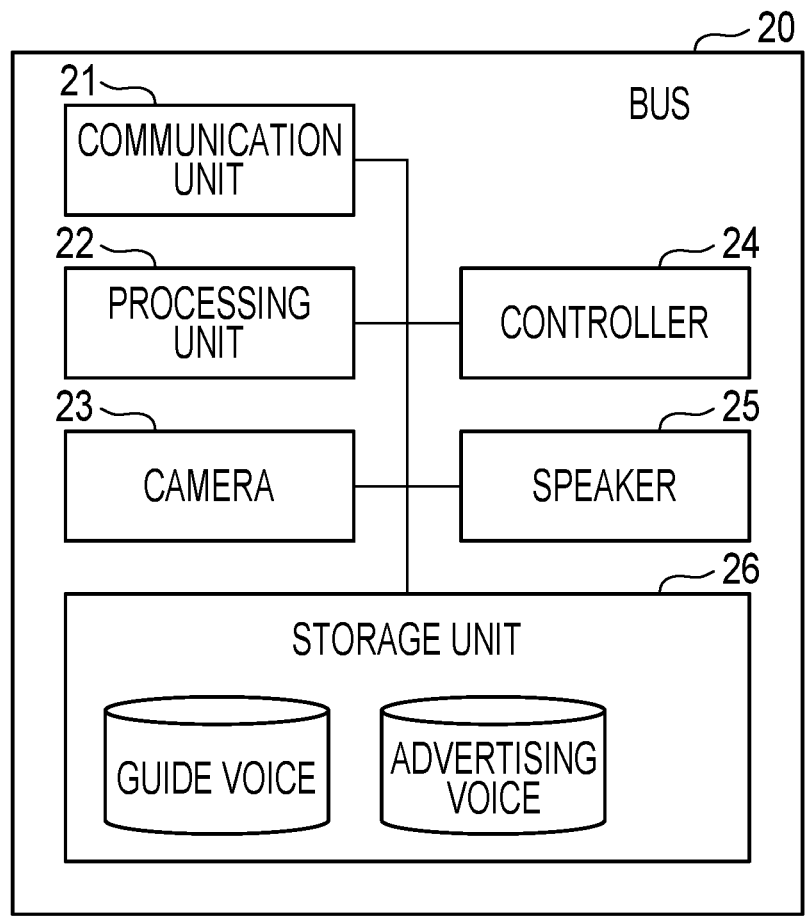
Figure 2:
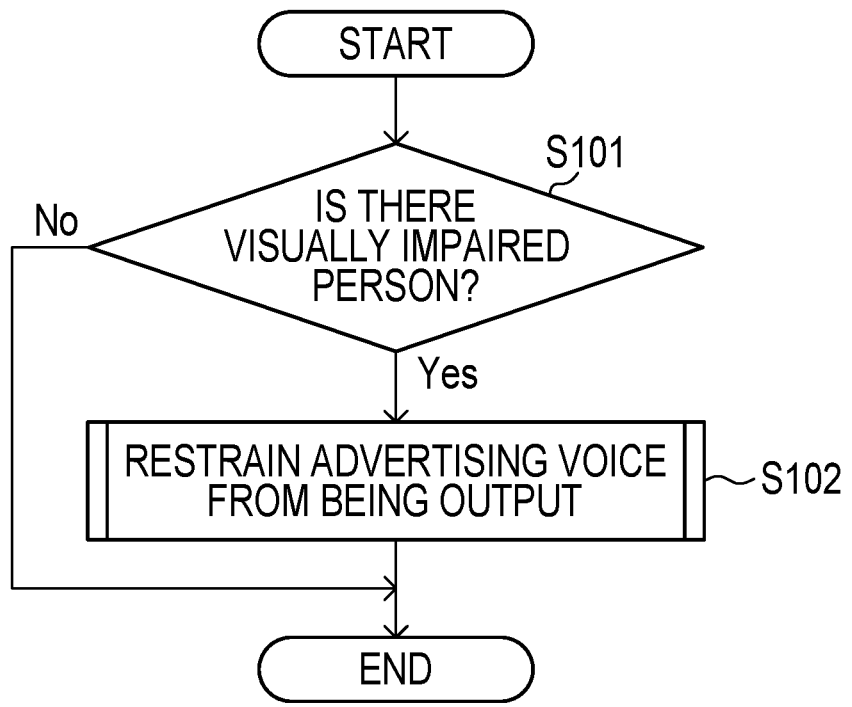
FIG. 2 is a flowchart showing an operation of a bus according to the embodiment.

An embodiment according to a voice output method will be described with reference to FIGS. 1 to 2. In the present embodiment, an example of public transportation includes a fixed-route bus that may be driven by autonomous driving. In FIG. 1, a public transportation system 1 to which the voice output method is applied includes a bus stop 10 and a bus 20.

The bus stop 10 has a communication unit 11, a processing unit 12, and a camera 13. The camera 13 may be disposed on, for example, a guide display board, a shed (that is, a roof structure) of a bus stop 10. The camera 13 images the surroundings of the bus stop 10 (particularly, a person waiting for a bus at the bus stop 10). The processing unit 12 performs predetermined image processing on the image captured by the camera 13 to recognize a person who has a white cane, as a visually impaired person.

The bus 20 has a communication unit 21, a processing unit 22, a camera 23, a controller 24, a speaker 25, and a storage unit 26. The camera 23 is disposed so as to be able to image the inside of the bus 20. The processing unit 22 performs predetermined image processing on the image captured by the camera 23 to recognize a person who has a white cane, as a visually impaired person. The storage unit 26 stores a guide voice related to the information on the bus 20 and an advertising voice related to advertising. The guide voice may include, for example, a voice for giving a guide to a bus stop, a voice related to the behavior of the bus 20 (for example, "this bus is now leaving", "this bus is turning right", "this bus is turning left", "this bus is stopping", and "this bus is stopping suddenly"), and a voice for giving a guide to in-vehicle facilities of the bus 20 (for example, seat belts and priority seats). Here, the guide voice and the advertising voice are stored separately (that is, severally) in the storage unit 26.

The bus stop 10 and the bus 20 are configured to communicate with each other via the communication units 11 and 21. Since various existing aspects can be applied to the communication method between the bus stop 10 and the bus 20, the details thereof will be omitted.

When a visually impaired person is recognized from the image captured by the camera 13, the processing unit 12 transmits information indicating that there is a visually impaired person at the bus stop 10 to the bus 20 via the communication unit 11. On the other hand, when the visually impaired person is not recognized from the above image, the processing unit 12 may transmit information indicating that there is no visually impaired person at the bus stop 10 to the bus 20 via the communication unit 11, or may not transmit information indicating the presence or absence of the visually impaired person.

The controller 24 of the bus 20 that has received the information indicating that there is a visually impaired person at the bus stop 10 via the communication unit 21 restrains the advertising voice from being output, for example, after the bus 20 arrives at the bus stop 10. At this time, the controller 24 may restrain the advertising voice from being output on a condition that the visually impaired person is recognized by the processing unit 22 (that is, on a condition that the visually impaired person who has got on the bus 20 at the bus stop 10 is recognized). On the other hand, the controller 24 does not restrain the guide voice from being output.

"Restraining the advertising voice from being output" may include concepts, such as lowering or muting the volume of the advertising voice, reducing the output frequency of the advertising voice, and prohibiting the advertising voice from being output.

The controller 24 of the bus 20 determines whether or not the visually impaired person is recognized by the processing unit 22, for example, when the door (that is, the entrance/exit) of the bus 20 is opened and closed. When the controller 24 determines that the visually impaired person is not recognized by the processing unit 22, the controller 24 presumes that the visually impaired person has got off the bus, and cancels the restraint of the output of the advertising voice. On the other hand, when the controller 24 determines that the visually impaired person is recognized by the processing unit 22, the controller 24 continues to restrain the advertising voice from being output.

The image processing in each of the processing unit 12 of the bus stop 10 and the processing unit 22 of the bus 20 may be performed by a device different from the bus stop 10 and the bus 20 (for example, a server on the network). In this case, the processing unit 12 of the bus stop 10 may transmit the image captured by the camera 13 to the different device via the communication unit 11. The different device may transmit, to the bus 20, the result (that is, information indicating whether or not the visually impaired person is recognized) obtained by performing predetermined image processing on the image captured by the camera 13. The processing unit 22 of the bus 20 may transmit the image captured by the camera 23 to the different device via the communication unit 21. The different device may transmit, to the bus 20, the result obtained by performing predetermined image processing on the image captured by the camera 23.

The controller 24 of the bus 20 may display, for example, character information corresponding to the advertising voice on a display device visible to passengers inside the bus 20, in a period in which the advertising voice is restrained from being output. The controller 24 may, for example, raise the volume of the guide voice or lower the reproduction speed of the guide voice in the period in which the advertising voice is restrained from being output such that the visually impaired person can easily hear the guide voice. For example, a special guide voice created such that the visually impaired person can easily hear the guide voice may be stored in the storage unit 26. In this case, the controller 24 may output the special guide voice in the period in which the advertising voice is restrained from being output. When the controller 24 outputs the guide voice in the period in which the advertising voice is restrained from being output, the controller 24 may output, for example, a pre-notification voice for giving a pre-notification that the guide voice is output, before outputting the guide voice.

Next, the operation of the controller 24 of the bus 20 will be described with reference to the flowchart of FIG. 2. In FIG. 2, the controller 24 determines whether or not there is a visually impaired person (step S101). In the processing of step S101, when the controller 24 determines that there is a visually impaired person (step S101: Yes), the controller 24 restrains the advertising voice from being output (step S102). Then, after a predetermined time has elapsed, the processing of step S101 is performed. That is, the operation shown in FIG. 2 is repeatedly performed at a cycle corresponding to the predetermined time.

In the processing of step S101, when the controller 24 determines that there is no visually impaired person (step S101: No), the controller 24 cancels the restraint of the output of the advertising voice while the advertising voice is restrained from being output. Then, after a predetermined time has elapsed, the processing of step S101 is performed. On the other hand, while the advertising voice is not restrained from being output, the processing of step S101 is performed after a predetermined time has elapsed.

Technical Effect

In the public transportation system 1, when a visually impaired person is on the bus 20, the controller 24 restrains the advertising voice from being output. Therefore, for example, it can be expected that the visually impaired person can relatively easily hear the guide voice. Further, it can be expected that the visually impaired person can relatively easily hear the surrounding voice (that is, the environmental voice) because the advertising voice is restrained from being output. Accordingly, with the public transportation system 1, it is possible to restrain the visually impaired person's grasp of the situation from being distracted.

The controller 24 of the bus 20 may output, when the bus 20 is stopped at a place other than the bus stop, a voice for notifying the visually impaired person of the reason for the stop of the bus 20 (for example, waiting for a signal and a traffic jam), as the guide voice, in order to assist the visually impaired person in grasping the situation, in the period in which the advertising voice is restrained from being output (that is, a period in which the visually impaired person is on the bus 20).

The controller 24 of the bus 20 may output, for example, a voice for giving a notification that the visually impaired person is on the bus 20 or a voice for requesting to avoid talking, in the period in which the advertising voice is restrained from being output. The public transportation system 1 is not limited to the fixed-route bus, and can be applied to other public transportation systems, such as railways.

Various aspects of the disclosure derived from the embodiment described above will be described below.

According to an aspect of the disclosure, there is provided a voice output method in a moving body of public transportation, including: a storage step of storing a voice output to an inside of the moving body, the voice being stored by being divided into a guide voice related to information on the moving body and an advertising voice related to advertising; a determination step of determining whether or not a passenger of the moving body includes a visually impaired person; and a restraint step of, by the moving body, restraining the advertising voice from being output when determination is made that the passenger includes the visually impaired person. In the above-mentioned embodiment, the "bus 20" corresponds to an example of the "moving body of public transportation".

In the voice output method, the moving body may not restrain the guide voice from being output even when determination is made that the passenger includes the visually impaired person.

In the voice output method, the moving body may output, before outputting the guide voice, a pre-notification voice for giving a pre-notification that the guide voice is output, when determination is made that the passenger includes the visually impaired person.

The present disclosure is not limited to the above-mentioned embodiment, and can be appropriately modified within the scope not contrary to the scope of claims and the gist or idea of the disclosure that can be read from the entire specification, and voice output methods with such changes are also included in the technical scope of the present disclosure.

What is claimed is:

1. A voice output method in a moving body of public transportation, the voice output method comprising:
   a storage step of storing a voice output to an inside of the moving body, the voice being stored by being divided into a guide voice related to information on the moving body and an advertising voice related to advertising;
   a determination step of determining whether or not a passenger of the moving body includes a visually impaired person; and
   a restraint step of, by the moving body, restraining the advertising voice from being output when determination is made that the passenger includes the visually impaired person.

2. The voice output method according to claim 1, wherein the moving body does not restrain the guide voice from being output even when determination is made that the passenger includes the visually impaired person.

3. The voice output method according to claim 1, wherein the moving body outputs, before outputting the guide voice, a pre-notification voice for giving a pre-notification that the guide voice is output, when determination is made that the passenger includes the visually impaired person.

\* \* \* \* \*